Oct. 8, 1940.   J. VISMAN   2,216,863
MOLDING
Filed Aug. 28, 1935
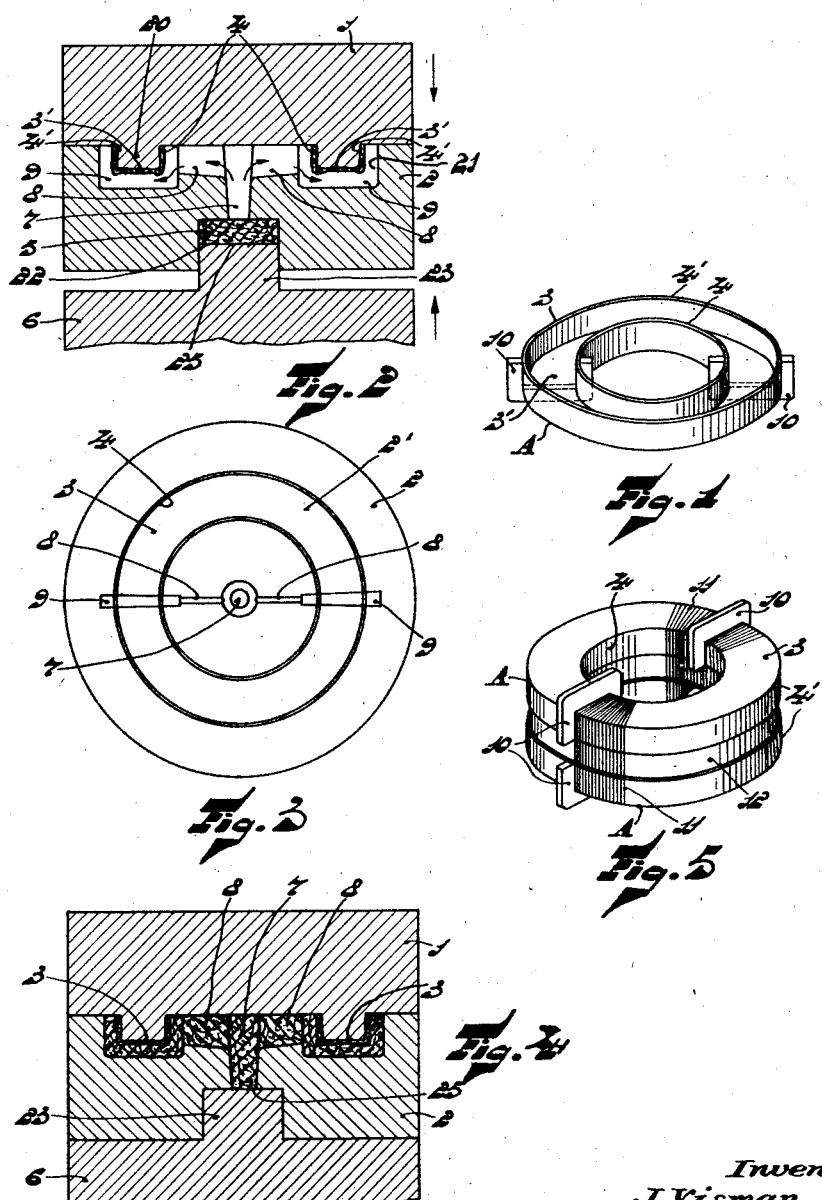

Patented Oct. 8, 1940

2,216,863

UNITED STATES PATENT OFFICE 2,216,863

MOLDING

Jean Visman, Eindhoven, Netherlands, assignor, by mesne assignments, to Hartford National Bank and Trust Company, Hartford, Conn., as trustee Application August 28, 1935, Serial No. 38,333
In Germany August 31, 1934

1 Claim. (Cl. 175—359)

My invention relates to moldings and more particularly to moldings having projecting portions.

My invention is particularly important for moldings in which the projections are formed on thin-walled portions, for instance the insulating members of coils. I shall describe my invention in connection with the moldings for such coils, more particularly for a so-called "Pupin coil," however its use is not limited thereto.

It is frequently necessary to make Pupin coils very compact so that a number of them can be provided within a limited space. Therefore the moldings used for these coils must take up as little space as possible, and thus they should be thin-walled, while at the same time they must be mechanically strong and possess good electrical properties.

It is well known to form moldings of a moldable mixture containing a synthetic resin which flows and hardens under the action of heat and pressure. Such moldings, however, have rather low mechanical strength, especially if they have thin-walled portions. To obtain articles of much greater mechanical strength it is also known to use fiber layers impregnated with such synthetic hardening resin; the impregnated fiber layers being pressed together. However, if moldings are required which have projecting portions attached to their thin-walled portions, and at the same time a high electrical insulation is required, difficulties arise because the impregnated fiber layers have not sufficient flowing capacity to properly fill out the projecting portions of the molding, and thereby such moldings do not assume the required shape.

In accordance with the invention I overcome the above difficulties by making the thin-walled portions of the molding from layers of fibrous material impregnated with a hardening resin, and by making the projecting portions of a synthetic resin containing moldable mixture which readily flows and is hardened by the action of heat.

In order that the invention may be more clearly understood and readily carried into effect, I shall describe the same more fully with reference to the accompanying drawing, in which:

Figure 1 is a perspective view of a finished molding produced in accordance with the invention;

Fig. 2 is a sectional view of a three-part mold suitable for producing the molding shown in Figure 1;

Fig. 3 is a top view of the central and stationary part of the mold shown in Figure 2;

Fig. 4 is a sectional view showing the mold of Fig. 1 in the final stage of the molding operation;

Fig. 5 is a perspective view of a Pupin coil using moldings as shown in Fig. 1.

Referring to Figure 1, the molding A shown therein forms an integral structure and comprises a thin-walled annular member 3 having a channel-shaped cross section and comprising a ring-shaped bottom 3' with inner and outer rims 4 and 4'. The molding A furthermore comprises two projections 10—10 forming U-shaped ribs at diametrically opposite portions of the member 3. The thin-walled member 3 is formed of an impregnated fiber material, for instance linen which has been impregnated prior to the molding with a solution of a hardening synthetic resin, for example a phenol formaldehyde condensation product; whereas the projections 10—10 are formed of a moldable mixture of a similar synthetic resin and a filler such as wood-dust.

A suitable mold to form the molding A, is shown in Figs. 2 to 4 and consists of an upper movable plunger 1, a central and stationary portion 2, and a lower movable plunger 6; the plungers 1 and 6 being movable in the directions indicated by the arrows.

The stationary part 2 is provided on its top with an annular cavity 21 and two radial grooves 9—9, which together form the outer contour of the molding A; the cavity 21 serving to form the thin-walled, annular member 3, and the grooves 9—9 serving to form the projections 10—10. The stationary part 2 is also provided with a tapered bore 7 interconnected with the grooves 9—9 by two narrow radial slots 8—8. On the bottom, the stationary part 2 is provided with a counterbore 22, which opens into the bore 7, and in which is placed the proper amount of a moldable mixture 5, of the type mentioned above.

The upper plunger 1 is provided with an annular protuberance 20 adapted to fit into the cavity 21. The lower plunger 6 is provided on the top with a cylindrical protuberance 23 forming a plunger adapted to fit into the counterbore 22 and having a pressing surface 25.

To form the molding A a flat ring of a suitable impregnated fiber adapted to form, in the cavity 21, the thin-walled, annular member 3, for example a ring of linen soaked with a solution of hardening resin, is placed on top of the part 2 to oppose the cavity 21 and overlap same on both sides. The moldable mixture 5 is placed as indicated in Figure 2. To form the moulding A forces are exerted simultaneously on the movable plungers 1 and 6 in the direction of the arrows. Thereby with a downward movement plunger 1 presses the resin-impregnated fiber into the cavity 21 to form the desired channel-shaped, thin-walled member 3, whereas plunger 23 presses with an upward movement of member 6 the moldable mixture 5 through bore 7 and slots 8—8 into the U-shaped grooves 9—9. The pressing operation takes place with the application of heat. While the forces are applied to the plungers 1 and 6 simultaneously, nevertheless, due to the relatively large area of the pressing surface 25, and to the pressure required to force the material 5 to flow, the upper plunger 1 first moves downward into the position shown in Fig. 2 and presses the fiber material into its proper form before the lower plunger 6 moves upward to force the material 5 to flow into the grooves 9—9 to form on the member 3 projections 10—10.

In Fig. 4 the upper and lower plungers are shown after having been moved into their final positions, and the moldable mixture 5 has been pressed into the cavity 7, slots 8—8, and grooves 9—9. As the slots 8—8 are made very narrow (see Fig. 3), the excess or riser material remaining in the bore 7 and in the slots 8—8 can be simply and readily removed from the projections 10—10 after the completed molding A has been removed from the mold.

The moldings produced according to the invention, as stated, are especially suitable for use in the construction of the Pupin coils. Such a construction is shown in Fig. 5 where two moldings A are arranged with the members 3—3 facing each other with opposite sides. A suitable ferromagnetic core 12, formed for instance of a wound band of iron-nickel fits in between the moldings and is held in position by the rims 4—4' thereof. The assembly thus formed is provided with two windings 11—11 consisting, for example, of enameled copper wire; the windings 11—11 being wound one on each half of the assembly and insulatingly separated from each other by the projections 10—10.

As in mass production, the band 12 will not always be of uniform diameter, it is preferable that the annular member 3 and its rims 4—4' be made slightly flexible and yielding to take care of variations in the size of the core. The moldings produced according to the present invention provide this flexibility and consequently no difficulties arise due to the assembling of the parts.

While I have described my invention in connection with specific examples and in specific applications, I do not wish to be limited thereto, but desire the appended claim to be construed as broadly as permissible in view of the prior art.

What I claim is:

A protective cap-piece molding for coils having a core, comprising a thin-walled portion of a fibrous-layer material impregnated with synthetic resin, said portion having a U-shaped cross-section, and U-shaped ribs of homogeneous synthetic resin molding material integral with said portion.

JEAN VISMAN.